(12) United States Patent
Parvataneni et al.

(10) Patent No.: US 11,296,938 B2
(45) Date of Patent: *Apr. 5, 2022

(54) METHOD AND SYSTEM FOR RESOURCE MANAGEMENT BASED ON MACHINE LEARNING

(71) Applicant: Verizon Patent and Licensing Inc., Basking Ridge, NJ (US)

(72) Inventors: Raghuram Parvataneni, Edison, NJ (US); Kirk Campbell, Long Valley, NJ (US); Ravi Sharma, Freehold, NJ (US); Anil K Guntupalli, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/207,864

(22) Filed: Mar. 22, 2021

(65) Prior Publication Data

US 2021/0211352 A1    Jul. 8, 2021

Related U.S. Application Data

(63) Continuation of application No. 16/538,978, filed on Aug. 13, 2019, now Pat. No. 10,985,979.

(51) Int. Cl.
| | | |
|---|---|---|
| *G06F 15/173* | (2006.01) | |
| *H04L 41/0806* | (2022.01) | |
| *H04L 47/74* | (2022.01) | |
| *H04L 47/78* | (2022.01) | |
| *H04L 43/16* | (2022.01) | |
| *H04L 41/16* | (2022.01) | |
| *G06N 20/00* | (2019.01) | |
| *H04L 41/5041* | (2022.01) | |
| *H04L 43/0876* | (2022.01) | |

(52) U.S. Cl.
CPC ......... *H04L 41/0806* (2013.01); *G06N 20/00* (2019.01); *H04L 41/16* (2013.01); *H04L 41/5041* (2013.01); *H04L 43/0876* (2013.01); *H04L 43/16* (2013.01); *H04L 47/745* (2013.01); *H04L 47/788* (2013.01)

(58) Field of Classification Search
CPC ...................................................... G06N 20/00
See application file for complete search history.

(56) References Cited

U.S. PATENT DOCUMENTS

| | | | |
|---|---|---|---|
| 10,985,979 B2 * | 4/2021 | Parvataneni | ............ H04L 43/16 |
| 2019/0089588 A1 | 3/2019 | Xu et al. | |
| 2019/0243691 A1 | 8/2019 | Labute et al. | |
| 2020/0081648 A1 | 3/2020 | Bernat et al. | |

\* cited by examiner

*Primary Examiner* — Yves Dalencourt (57) ABSTRACT

A method, a device, and a non-transitory storage medium are described in which a machine learning-based resource management service is provided. A network device obtains network and end device information, and uses machine learning to determine whether to adjust an auto-scaling rule pertaining to the provisioning of an application service. The network device generates a modified auto-scaling rule based on the analysis.

20 Claims, 6 Drawing Sheets

METHOD AND SYSTEM FOR RESOURCE MANAGEMENT BASED ON MACHINE LEARNING

CROSS REFERENCE TO RELATED APPLICATION

This patent application is a continuation of U.S. patent application Ser. No. 16/538,978, entitled "METHOD AND SYSTEM FOR RESOURCE MANAGEMENT BASED ON MACHINE LEARNING" and filed on Aug. 13, 2019, the disclosure of which is incorporated herein by reference in its entirety.

BACKGROUND

Development and design of networks present certain challenges from a network-side perspective and an end device perspective. In order to enhance performance, multi-access edge computing (MEC) (also known as mobile edge computing (MEC)) is being explored in which core network capabilities (e.g., computational, storage, communication links, etc.) are situated at the network edge in order to reduce traffic being sent to the core network and reduce latency.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

MEC networks or other types of end device application or service layer networks (referred to as "application service layer network") may not always have sufficient available resources to accommodate all end devices at all times. For example, the MEC network may have insufficient resources (e.g., physical, logical, virtual) due to the number of end devices/users being served, the number of applications running simultaneously, the amount of content data involved in relation to the applications (e.g., 3D extreme reality, etc.), the state of the network (e.g., in the process of being deployed, reconfigured, upgraded; failures; congestion; etc.), and/or the state of neighboring networks (e.g., failures, congestion, etc.). As a result, the MEC network or other types of application service layer networks may be unable to support a level of quality of service associated with an application and/or a service (referred to as an "application service"). For example, the delivery of an application service to an end device may suffer from degradation of various performance metrics, such as latency, error rate, throughput, packet loss, etc. Additionally, some users of an application service may be denied service, and other users may experience intermittent application service.

Auto-scaling techniques may be used to manage resource allocation of the application-layer service network, such as a MEC network. The scaling of resources pertaining to an application service may include vertical auto-scaling (e.g., modifying an amount of a resource allocated to a MEC server, etc.) and/or horizontal scaling (e.g., adding or removing a MEC server assigned to a virtual Internet Protocol (VIP), etc.). Auto-scaling mechanisms may dynamically adjust network resources to support an application service based on auto-scaling rules that may include various threshold values for triggering vertical and/or horizontal auto-scaling. However, these types of auto-scaling mechanisms do not provide auto-scaling rules that are dynamic and do not automatically adjust over time to manage resources. For example, network administrators or other personnel may configure auto-scaling rules that are static in nature. Additionally, depending on the application service layer network, the auto-scaling rules may not be configured to most efficiently use resources when there are an abundance of resources available. For example, a MEC network may operate with a scarce amount of resources while cloud networks or other types of application layer networks may operate with more plentiful resources.

According to exemplary embodiments, a machine learning-based resource management service is provided. According to an exemplary embodiment, the machine learning-based resource management service may auto-scale resources based on machine learning. According to an exemplary embodiment, the machine learning-based resource management service may provide vertical and/or horizontal scaling based on auto-scaling rules that may automatically adjust over time. For example, the machine learning-based resource management service may use network information, end device information, and/or other types of collected information, as described herein, as a basis to automatically adjust and/or apply auto-scaling rules for managing network resources associated with an application service of an application service layer network. For example, minimum threshold values, maximum threshold values, and/or other types of parametric values included in the auto-scaling rules may change over time based on the analysis of collected information, a machine learning system, and network policies.

In view of the foregoing, the machine learning-based resource management service auto-scales resources in an application service layer network based on a machine learning system. As a result, the machine learning-based resource management service may improve resource allocation and/or utilization at the end device and/or in the network. For example, the machine learning-based resource management service may automatically adjust auto-scaling rules and continuously evaluate auto-scaling configurations and decisions, without human monitoring and intervention, to achieve optimal resource management. The machine learning-based resource management service may adjust auto-scaling rules with minimal delay compared to human-based auto-scaling approaches. Further, the machine learning-based resource management service may use various types of information (e.g., historical and current information pertaining to collected information, auto-scaling rules, etc.) that provides a more extensive evaluation and analysis of auto-scaling rules compared to human-based auto-scaling approaches. As a result, the machine learning-based resource management resource may effectively manage resources and prevent denial or intermittent delivery of an application service.

Figure 1:
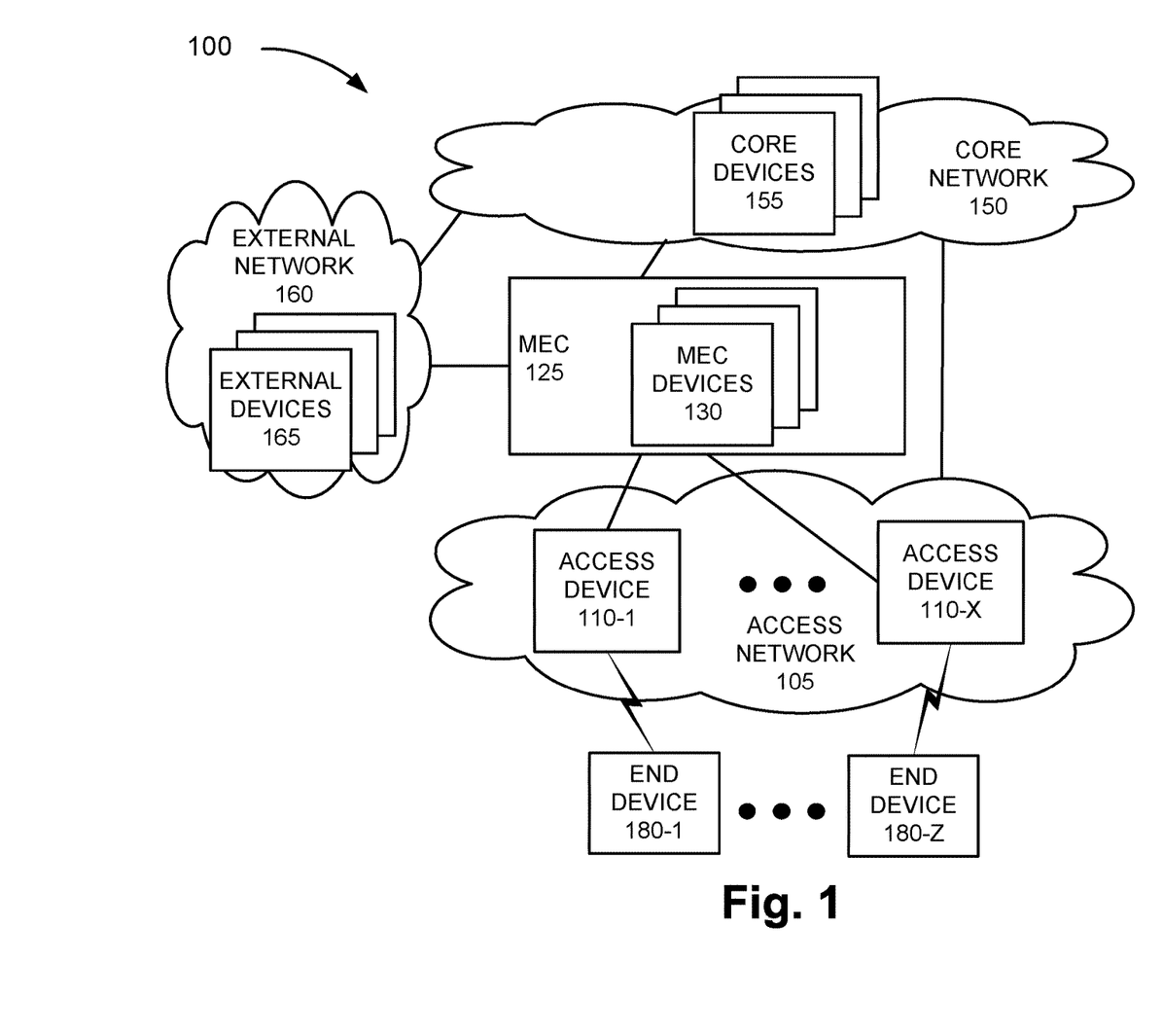
FIG. 1 is a diagram illustrating an exemplary environment in which an exemplary embodiment of a machine learning-based resource management service may be implemented.

FIG. 1 is a diagram illustrating an exemplary environment 100 in which an exemplary embodiment of the machine learning-based resource management service may be implemented. As illustrated, environment 100 includes an access network 105, a MEC network 125, a core network 150, and an external network 160. Access network 105 may include access devices 110-1 through 110-X (referred to collectively as access devices 110 and individually (or generally) as access device 110). MEC network 125 may include MEC devices 130, core network 150 may include core devices 155, and external network 160 may include external devices 165. Environment 100 further includes end devices 180-1 through 180-Z (referred to collectively as end devices 180 and individually (or generally) as end device 180).

The number, the type, and the arrangement of network devices, and the number of end devices 180, are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the networks, between the network devices, and between end devices 180 and the network/network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the machine learning-based resource management service may use at least one of these planes of communication. Additionally, an interface of a network device may be modified (e.g., relative to an interface defined by a standards body, such as Third Generation Partnership Project (3GPP), International Telecommunication Union (ITU), European Telecommunications Standards Institute (ETSI), etc.) in order to support the communication (e.g., transmission and reception of messages, information elements (IE), attribute value pairs (AVPs), etc.) between network devices and/or between a network device and an end device in support of the machine learning-based resource management service, as described herein. According to various exemplary implementations, the interface may be a service-based interface or a reference point-based interface.

Access network 105 may include one or multiple networks of one or multiple types and technologies. For example, access network 105 may include a Fourth Generation (4G) RAN, a 4.5G RAN, a Fifth Generation (5G) RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, an LTE-A Pro network, and/or a next generation (NG) RAN. Access network 105 may further include other types of wireless networks, such as a WiFi network, a Worldwide Interoperability for Microwave Access (WiMAX) network, a local area network (LAN), a Bluetooth network, a personal area network (PAN), or another type of network (e.g., a legacy Third Generation (3G) RAN, etc.) that may be considered a network edge.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., radio access technologies (RATs), etc.), wireless standards, wireless frequencies/bands/carriers (e.g., centimeter (cm) wave, millimeter (mm) wave, below 6 Gigahertz (GHz), above 6 GHz, licensed radio spectrum, unlicensed radio spectrum, etc.), and/or other attributes of radio communication.

Access network 105 may include different and multiple functional splitting, such as options 1, 2, 3, 4, 5, 6, 7, or 8 that relate to combinations of access network 105 and core network 150 including an Evolved Packet Core (EPC) network and/or a NG core (NGC) network, or the splitting of the various layers (e.g., physical layer, Media Access Control (MAC) layer, Radio Link Control (RLC) layer, and Packet Data Convergence Protocol (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of interface services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service.

Depending on the implementation, access network 105 may include one or multiple types of network devices, such as access devices 110. For example, access devices 110 may include an evolved Node B (eNB), a next generation Node B (gNB), an evolved Long Term Evolution (eLTE) eNB, a radio network controller (RNC), a remote radio head (RRH), a baseband unit (BBU), a CU, a DU, a small cell node (e.g., a picocell device, a femtocell device, a microcell device, a home eNB, a repeater, etc.)), or another type of wireless node (e.g., a WiFi device, a WiMax device, a hot spot device, etc.) that provides a wireless access service.

MEC network 125 includes a platform that provides an application service. As illustrated, MEC network 125 may be located at an edge of a network, such as access network 105. MEC network 125 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology.

Depending on the implementation, MEC network 125 may include various types of network devices that are illustrated in FIG. 1 as MEC devices 130. For example, MEC devices 130 may include virtual network devices (e.g., virtualized network functions (VNFs), servers, host devices, containers, hypervisors, virtual machines (VMs), network function virtualization infrastructure (NFVI), and/or other types of virtualization elements, layers, hardware resources, operating systems, engines, etc.) and associated application services for use by end devices 180. The application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, and/or other types of mobile edge application services.

MEC devices 130 may also include other network devices that support its operation, such as, an orchestrator (e.g., a network function virtualization orchestrator (NFVO), a mobile edge (ME) orchestrator, etc.), an edge manager (e.g., a virtualized infrastructure manager (VIM), a virtual network function manager (VNFM), an ME platform manager), an operations support system (OSS), a local domain name system (DNS), registries, and/or other types of network devices (e.g., routers, core devices 155 (e.g., a user plane function (UPF), etc.), an ingress device, a load balancer, etc.), and network resources (e.g., storage devices, communication links, etc.).

According to an exemplary embodiment, MEC devices 130 include logic that provides the machine learning-based resource management service, as described herein. For example, this MEC device 130 may include a machine learning device and an analytics engine. MEC device 130 may obtain various types of information, such as network information and end device information, and use this information as a basis to automatically determine whether auto-scaling rules for managing network resources should be changed or not. MEC device 130 may apply adjusted auto-scaling rules when it is determined that the current auto-scaling rules should be changed. For example, MEC device 130 may transmit the adjusted auto-scaling rules to a resource manager that governs allocated resources to virtual network devices, such as hosts, containers, VMs, or other types of network devices that provide an application service to end devices 180. According to various exemplary embodiments, the machine learning-based resource management service may include supervised learning, unsupervised learning, and/or reinforcement learning.

Core network 150 may include one or multiple networks of one or multiple network types and technologies. Core network 150 may include a complementary network of access network 105. For example, core network 150 may be implemented to include an Evolved Packet Core (EPC) of an LTE, an LTE-A network, an LTE-A Pro network, a next generation core (NGC) network, and/or a legacy core network.

Depending on the implementation of core network 150, core network 150 may include various network devices, such as core devices 155. For example, core devices 155 may include a mobility management entity (MME), a packet gateway (PGW), a serving gateway (SGW), a home subscriber server (HSS), an authentication, authorization, and accounting (AAA) server, a policy charging and rules function (PCRF), a charging system (CS), a UPF, an access and mobility management function (AMF), a session management function (SMF), a unified data management (UDM) device, an authentication server function (AUSF), a network exposure function (NEF), a network slice selection function (NSSF), a network repository function (NRF), a policy control function (PCF), a network data analytics function (NWDAF), and so forth. According to other exemplary implementations, core network 150 may include additional, different, and/or fewer network devices than those described.

External network 160 may include one or multiple networks. For example, external network 160 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a data center, or other type of network that hosts an end device application or service.

Depending on the implementation, external network 160 may include various network devices, such as external devices 165. For example, external devices 165 may provide various applications, services, or other type of end device assets, such as servers (e.g., web, application, cloud, etc.), mass storage devices, data center devices, and/or other types of network devices pertaining to various network-related functions.

End device 180 includes a device that has computational and wireless communication capabilities. End device 180 may be implemented as a mobile device, a portable device, a stationary device, a device operated by a user, or a device not operated by a user. For example, end device 180 may be implemented as a Mobile Broadband device, a smartphone, a computer, a tablet, a netbook, a phablet, a wearable device, a vehicle support system, a game system, a drone, or some other type of wireless device. According to various exemplary embodiments, end device 180 may be configured to execute various types of software (e.g., applications, programs, etc.). The number and the types of software may vary among end devices 180. End device 180 may support one or multiple RATs (e.g., 4G, 5G, etc.), one or multiple frequency bands, network slicing, DC service, and so forth. Additionally, end device 180 may include one or multiple communication interfaces that provide one or multiple (e.g., simultaneous or non-simultaneous) connections via the same or different RATs, frequency bands, etc.

Figure 2A:
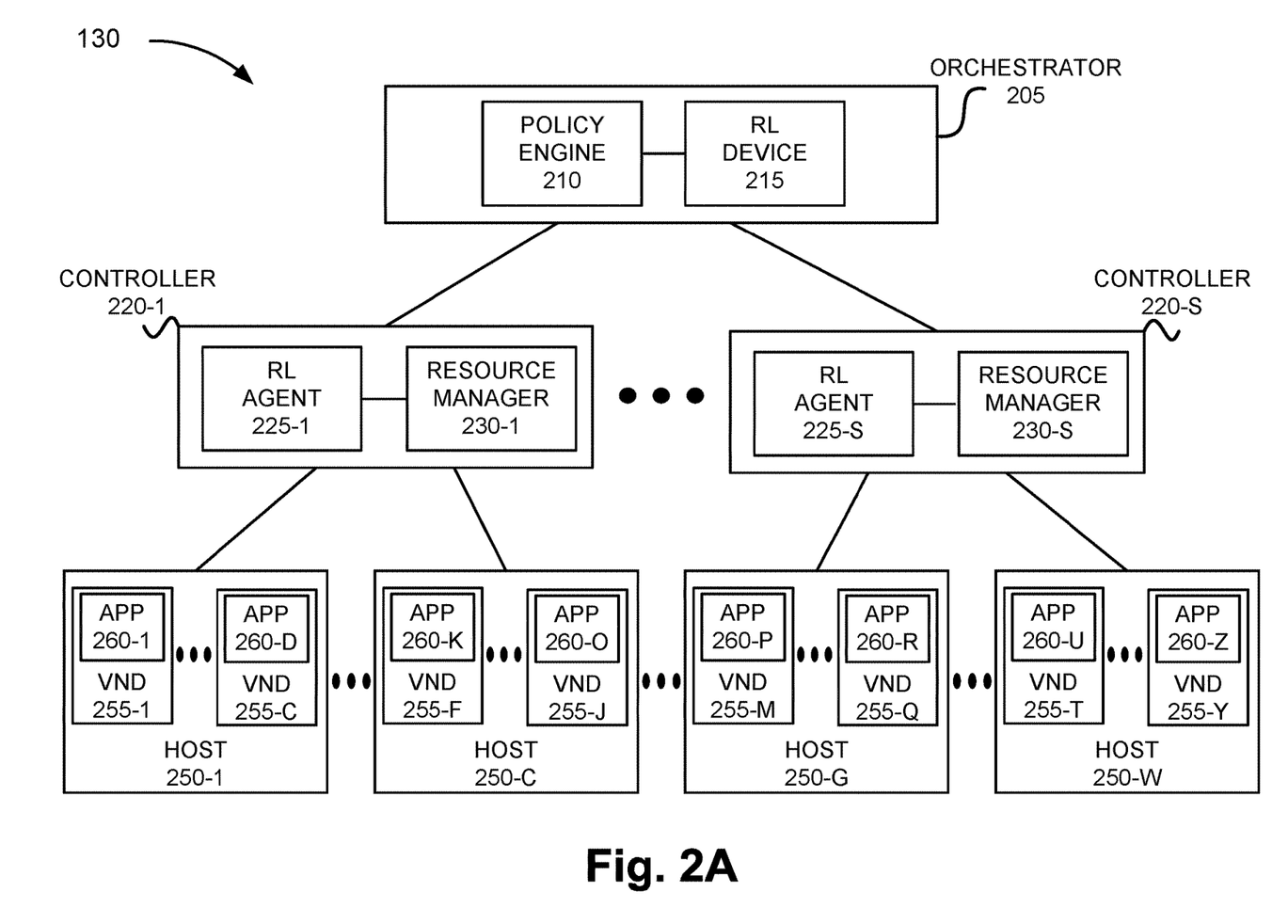
FIGS. 2A and 2B are diagrams illustrating an exemplary embodiment of network devices that provide the machine learning-based resource management service.
Figure 2B:
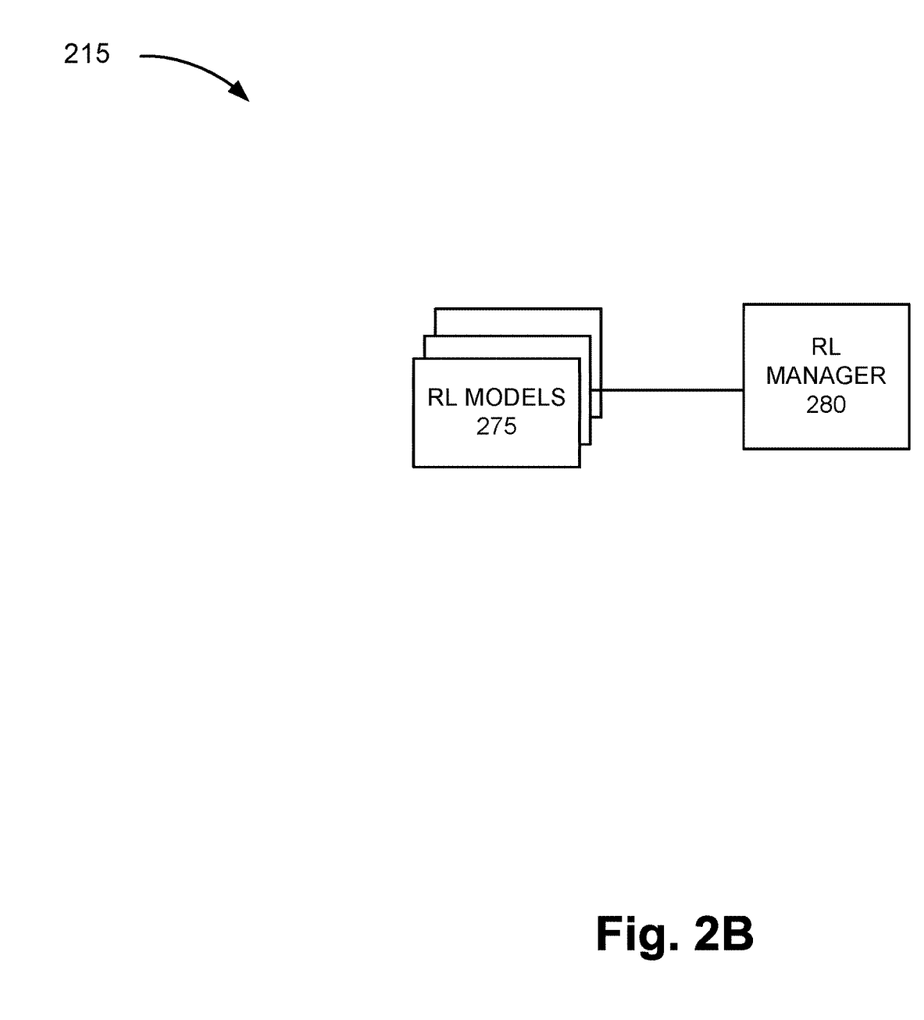

FIGS. 2A and 2B are diagrams illustrating exemplary MEC devices 130 of MEC network 125 that may provide the machine learning-based resource management service, as described herein. According to various exemplary embodiments, MEC devices 130 may pertain to one or multiple MEC networks 125. As illustrated, MEC devices 130 may include an orchestrator 205, controllers 220-1 through 220-S (also referred to as controllers 220, and individually or generally as controller 220), and hosts 250-1 through 250-W (also referred to as hosts 250, and individually or generally as host 250).

The number, the type, and the arrangement of MEC devices 130 are exemplary. The number and the arrangement of communication links illustrated are also exemplary. MEC network 125 may include additional and/or different MEC devices 130 in other exemplary embodiments. For example, MEC devices 130 may include additional and/or different system or management level MEC devices 130 that are not illustrated and described for the sake of brevity. Additionally, according to other exemplary embodiments, MEC devices 130 may include a machine learning device, instead of or in addition to a reinforcement learning device. For example, MEC devices 130 may include a supervised learning device and/or an unsupervised learning device.

Orchestrator 205 includes logic that provides the machine learning-based resource management service. According to an exemplary embodiment, orchestrator 205 may include a policy engine 210 and a reinforcement learning (RL) device 215.

Policy engine 210 may store default auto-scaling rules for application services. For example, default auto-scaling rules may relate to a category of application services (e.g., mission critical, real-time, non-real-time, video streaming, IoT, etc.) and/or on a per-application service basis. A default auto-scaling rule may include a minimum value and/or a maximum value relating to a triggering of an auto-scale (e.g., vertical, horizontal, etc.). The default auto-scale rule may include other information or policy, such as a schedule for auto-scaling, a time period in which a minimum value and/or a maximum value is sustained, different types of triggering events (e.g., Hypertext Transfer Protocol (HTTP) triggers, non-HTTP triggers, etc.) and/or other types of configurable parameters (e.g., precedence between rules, resolving conflicts between rules, etc.) that may be used to govern auto-scaling. Policy engine 210 may include logic that performs other types of operations, such as monitoring and event generation to react to changing conditions at orchestrator 205 and external network devices or integrated technologies of the MEC platform, and triggering events pertaining to auto-scaling rules.

Reinforcement learning device 215 may include a model-based machine learning system. For example, referring to FIG. 2B, reinforcement learning device 215 may include reinforcement learning (RL) models 275. RL models 275 may include RL models that are application service specific, pertain to an application service category, as previously described, and/or some other configuration (e.g., controller 220 specific, time-period specific (e.g., peak loads, etc.)). RL models 275 may provide auto-scaling rules for application services or categories of application services that yield the most efficient use of resources given a current state pertaining to MEC network 125 and end device 180. RL models 275 may include neural networks, learning algorithms, look-up tables (e.g., state, action, result, etc.), equations, libraries, and/or other types of elements. Reinforcement learning device 215 and RL agents 225-1 through 225-S (also referred to as RL agents 225, and individually or generally as RL agent 225) may operate as a closed-loop system, as described herein.

As further illustrated, reinforcement learning device 215 may include an RL manager 280. RL manager 280 may include logic that updates RL models 275 based on feedback from RL agents 225. RL manager 280 may include logic that selects default auto-scaling rules from policy engine 210 for an application service and provides the selected default auto-scaling rules to RL agent 225. As described herein, RL agent 225 may modify the default auto-scaling rules subsequent to their use based on collected information (e.g., network performance information, end device performance information, etc.), and provide the modified auto-scaling rule to RL manager 280. RL manager 280 may store and share modified auto-scaling rules, which stems from a machine learning context associated with an RL agent 225, with other RL agents 225 across MEC network 125. RL manager 280 may further include logic that evaluates auto-scaling rules (e.g., default auto-scaling rules, modified auto-scaling rules, etc.) and executes actions via RL agents 225 at each edge.

Orchestrator 205 may include logic that performs other types of operations, such as management of application service/microservice rules and requirements, resource management, and/or other system level management functions pertaining to MEC network 125.

Referring to FIG. 2A, controller 220 includes logic that provides the machine learning-based resource management service. According to an exemplary embodiment, controller 220 may be included in a VIM, a VNFM, an ME platform manager, or an edge controller. According to an exemplary embodiment, controllers 220 include RL agents 225-1 through 225-S (also referred to as RL agents 225, and individually or generally as RL agent 225), and resource managers 230-1 through 230-S (also referred to as resource managers 230, and individually or generally as resource manager 230). As such, according to an exemplary embodiment, MEC devices 130 provide a multi-agent machine learning (MARL) environment (versus a single agent) that contributes to the learning process for managing resources based on adaptive auto-scaling rules.

RL agent 225 includes logic that provides the machine learning-based resource management service. According to an exemplary embodiment, RL agent 225 includes logic that uses various types of collected information as a basis to determine whether an auto-scaling rule should be modified. For example, the collected information may include network information and end device information. Network information may include information relating to resource utilization for physical, virtual, and/or logical resources at controller 220, host 250, and communication links. Network information may also include information relating to network performance, such as response rates for user requests, latency, packet drop rate, throughput, jitter, and/or other types of key performance indicators (KPIs), quality of service (QoS), service level agreement (SLA) parameters, and so forth. The network information may further include other types of information relating to health, security, usage of application service (e.g., the degree at which some features of an application service are used relative to other features, etc.), fault detection, and/or resource utilization and performance information relating to other networks (e.g., access network 105, access devices 110, external network 160, external devices 165, etc.) and communication links external to MEC network 125 that pertain to the provisioning of an application service. RL agent 225 may obtain the network information from a monitoring and tracking system (e.g., a monitoring system 305 in FIG. 3) in MEC network 125 and/or other configured source.

The collected information may further include end device information. For example, the end device information may include information relating to resource utilization for physical, virtual, and/or logical resources at end device 180. Additionally, end device information may also include information relating to end device performance, such as latency, packet drop rate, etc., and/or other types of KPIs, QoS, SLA parameters, and so forth. RLA agent 225 may obtain the end device information from end device 180 and/or a monitoring and tracking system (not illustrated) in MEC network 125 and/or other configured source.

Based on the analysis of the collected information and an auto-scaling rule (in use), such as a default auto-scaling rule or a modified auto-scaling rule, RL agent 225 may determine whether to maintain the current auto-scaling rule or modify the current auto-scaling rule. For example, RL agent 225 may use a machine learning algorithm (e.g., a quality learning (q-learning) algorithm) that seeks to find the best action to take given the current state indicated by the collected information. For example, RL agent 225 may perform a policy iteration that includes a loop between policy evaluation and policy improvement. The policy evaluation may include an estimation of a value function with a greedy policy obtained from a previous policy improvement. The policy improvement may update the policy (e.g., auto-scaling rule) with an action that maximizes the value function for a current state.

According to various exemplary embodiments, RL agent 225 may use "exploiting" (e.g., selecting an action based on a maximum value of possible actions) and/or "exploring" (e.g., selecting a random action) approaches for selecting an action in response to the current state. RL agent 225 may store and manage a q-table. According to other exemplary embodiments, RL agent 225 may use other machine learning algorithms (e.g., State-Action-Reward-State-Action (SARSA), Deep Q Network (DQN), etc.). For example, a policy may be represented in a deep neural network that takes as input a collection of metrics and/or parameters, as described herein, and may output a probability distribution over all possible actions. The neural network may be trained using Deep Q learning for estimating a Q-value function. For example, experience replay may be used in which previous transitions are stored, and a random selection from a transition pool may be used to update the knowledge.

According to an exemplary embodiment, for every action, RL agent 225 may apply a validation rule. For example, a validation rule may specify that a minimum temperature cannot exceed 80 degrees Fahrenheit or some other temperature value. The validation rules may be pre-defined for each RL agent 225. In this way, RL agent 225 may identify a transition (e.g., a state transition, etc.) based on parameter values stemming from a monitoring procedure, and a responsive action (e.g., based on a reward function, etc.) can be performed based on a comparison of the identified transition with a targeted state (e.g., a deserved or desired state, etc.). The targeted state may also be pre-defined along with rules that may be configured in RL agent 225. For example, a desired state may include an optimized state that has financial and/or performance benefits. Based on the reward, RL agent 225 may select an action from a pre-defined action set, and modifies the auto-scaling rule. Additionally, the action space may include modified auto-scaling properties and/or events, as described herein. RL agent 225 may modify one or multiple parameter values indicative of one or multiple properties, events, and/or policies.

The modification of the current auto-scaling rule may include modifying a parameter value (e.g., a minimum threshold value, a maximum threshold value, a range of values, etc.) that relates to auto-scaling resources in support of an application service. For example, a minimum threshold value of a current auto-scaling rule may be increased or decreased, or a numerical range specified in the current auto-scaling rule may be changed (e.g., to a range that falls outside the current range (partially or completely)). Additionally, or alternatively, the modification of the current auto-scaling rule may relate to other configuration settings included in the current auto-scaling rule (e.g., conflict, precedence, etc.).

According to an exemplary embodiment, RL agent 225 may communicate with resource manager 230 to apply the modified auto-scaling rule. Additionally, RL agent 225 may inform RL device 215 of the modified auto-scaling rule, as described herein.

As previously described, auto-scaling may include horizontal auto-scaling and/or vertical auto-scaling. For example, horizontal auto-scaling may include adjusting the number of instances of the same resource, and vertical auto-scaling may include adjusting the amount of resources of the same instance. According to an exemplary embodiment, RL agent 225 may determine the type of auto-scaling to use based on a policy.

Auto-scaling may be based on for example, properties and/or events. For example, the parameters that could be adjusted to trigger the respective auto-scaling rule may include minimum, maximum, and/or range values relating to hardware utilization, such as processor utilization (e.g., physical, virtual, logical), memory utilization (e.g., physical, virtual, logical); hits per second; network bytes received; network bytes transmitted; hardware temperature; hardware fan speed; voltage; and/or other types of monitored parameters, properties and/or events relating to the provisioning of an application service and/or a state of the system.

Resource manager 230 may include logic that manages the amount of physical, virtual, and/or logical resources provisioned for an application service. Resource manager 230 may modify the amount of resources allocated based on communication with RL agent 225, as described herein. For example, based on a modified auto-scale rule (relative to a default auto-scale rule), resource manager 230 may allocate resources to an application service and associated host(s) 250 based on the modified auto-scale rule.

Hosts 250 may include network devices that support the virtualization of application services. Host 250 provides various physical resources (e.g., processors, memory, storage, communication interface, and/or other types of hardware resources), software resources (e.g., operating system, etc.) and other virtualization elements (e.g., hypervisor, container engine, etc.). According to an exemplary embodiment, as illustrated, hosts 250 may include virtual network devices (VNDs) 255-1 through 255-Y (also referred to as virtual network devices 255, and individually or generally as virtual network device 255).

Virtual network devices 255 may be implemented as containers, VMs, or another type of virtualization architecture that provides one or multiple application services for end devices 180. Virtual network devices 255 may include applications (App) 260-1 through 260-Z (also referred to as applications 260, and individually or generally as application 260). Application 260 may include software, firmware, and/or another form of executable code for an application service. Applications 260 may include one or multiple instances of the same or different application services. Host 250 may support one or multiple virtual network devices 255 and applications 260 that provide application services and/or microservices (e.g., a task, a function, etc.) of the application service (also referred to as an application service), as described herein. Additionally, according to some exemplary embodiments, an application service may be provisioned, in part and/or in cooperation with, external devices 165 of external network 160.

Figure 3:
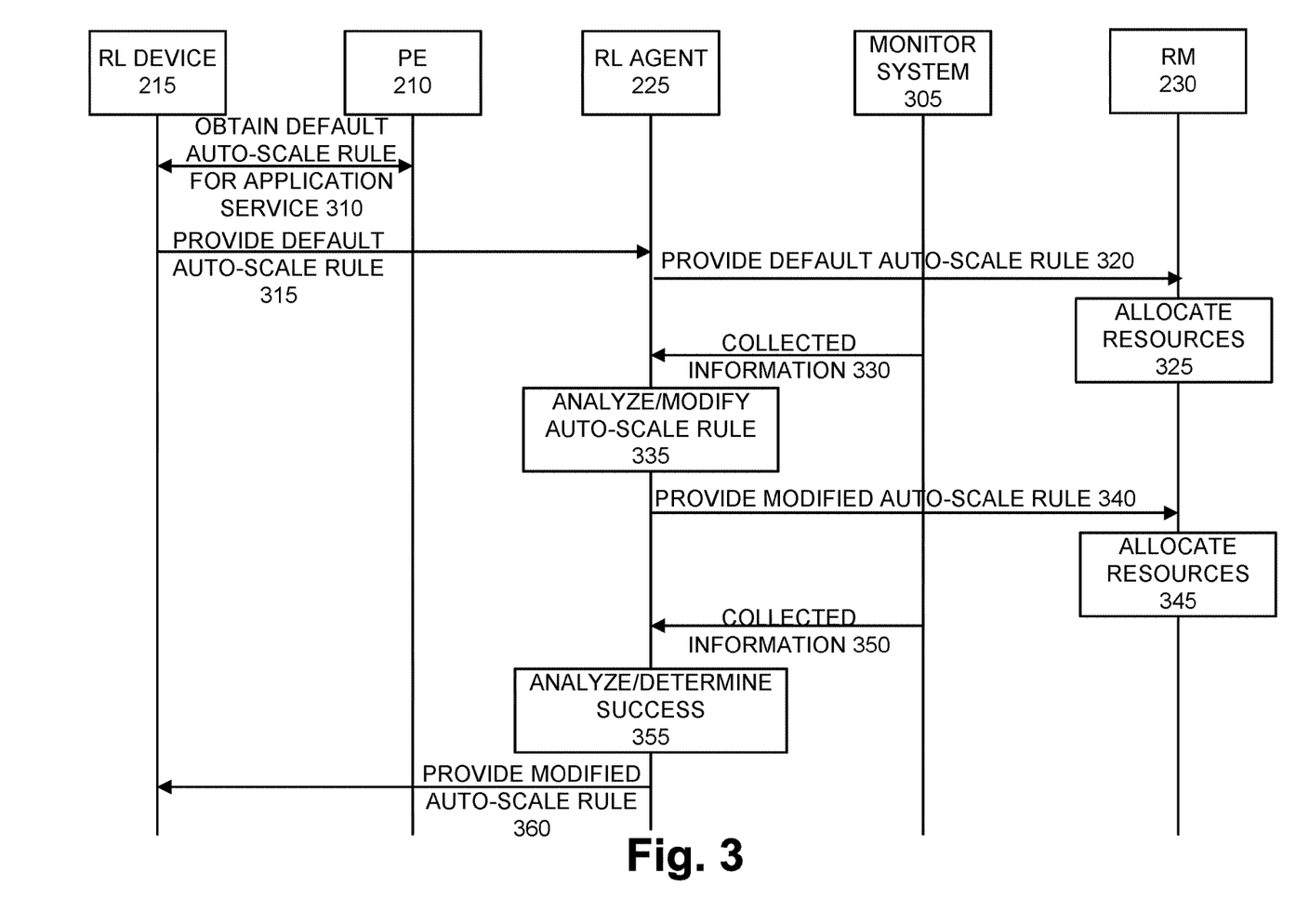
FIG. 3 is a diagram illustrating an exemplary process of an exemplary embodiment of the machine learning-based resource management service according to an exemplary scenario.

FIG. 3 is a diagram illustrating an exemplary process of the machine learning-based resource management service according to an exemplary scenario. According to this exemplary scenario, the process illustrated and described relates to a distributed provisioning process of the machine learning-based resource management service.

According to an exemplary scenario, assume RL device 215 of orchestrator 205 receives a triggering event. For example, the triggering event may be a request from end device 180 for an application service. In response, RL device 215 may obtain a default auto-scale rule for the application service 310 from policy engine (PE) 210. For example, RL device 215 may transmit a request to policy engine 210. The request may include data indicating an application service or a category of an application service. Policy engine 210 may perform a look-up for a default auto-scaling rule, and transmit a response, which includes the default auto-scale rule, to RL device 215.

In response to receiving the default auto-scaling rule, RL device 215 may select a controller 220 and/or a host(s) 250 to provide the requested application service. RL device 215 may provide the default auto-scale rule 315 to RL agent 225 of the selected controller 220. Orchestrator 205 may also request that controller 220 provisions the application service.

RL agent 225 may receive the default auto-scale rule, and may provide the default auto-scale rule 320 to resource manager 230. Resource manager 230 may allocate resources 325 for the application service in accordance with the default auto-scaling rule. For example, a host 250 may be provisioned for providing the application service requested by end device 180.

Subsequently, RL agent 225 may obtain collected information 330 from a monitoring system 305. For example, the collected information may include network information and end device information pertaining to the application service, as previously described herein. In response to receipt of the collected information, RL agent 225 may analyze the collected information relative to the current auto-scaling rule, and determine whether the current auto-scaling rule should be modified 335. For example, RL agent 225 may use a machine learning algorithm, as previously described. According to this exemplary scenario, assume that RL agent 225 determines that the auto-scaling rule is to be modified. RL agent 225 may generate a modified auto-scaling rule based on a result of the analysis.

As further illustrated in FIG. 3, RL agent 225 may provide the modified auto-scale rule 340 to resource manager 230. Resource manager 230 may adjust the allocation of resources (e.g., vertical scaling, horizontal scaling, etc.) for the application service based on the modified auto-scale rule. Thereafter, RL agent 225 may obtain collected information 350 from monitor system 305. RL agent 225 may analyze the collected information relative to the modified auto-scaling rule to determine whether further adjustment is needed or the modified auto-scaling rule has been successful 355. According to this exemplary scenario, assume that RL agent 225 determines that the application service is operating efficiently and satisfying performance metrics given the current allocation of resources. Based on this determination, RL agent 225 may provide the modified auto-scale rule 360 to RL device 215. RL device 215 may store and share the modified auto-scaling rule with other controllers 220.

FIG. 3 illustrates an exemplary process of the machine learning-based resource management service, according to other exemplary embodiments, the process may include additional, different, and/or fewer steps. For example, according to another exemplary scenario, when RL agent 225 determines that the application service is not operating efficiently and/or satisfying performance metrics, RL agent 225 may modify the auto-scaling rule again. This process may be iteratively performed.

Figure 4:
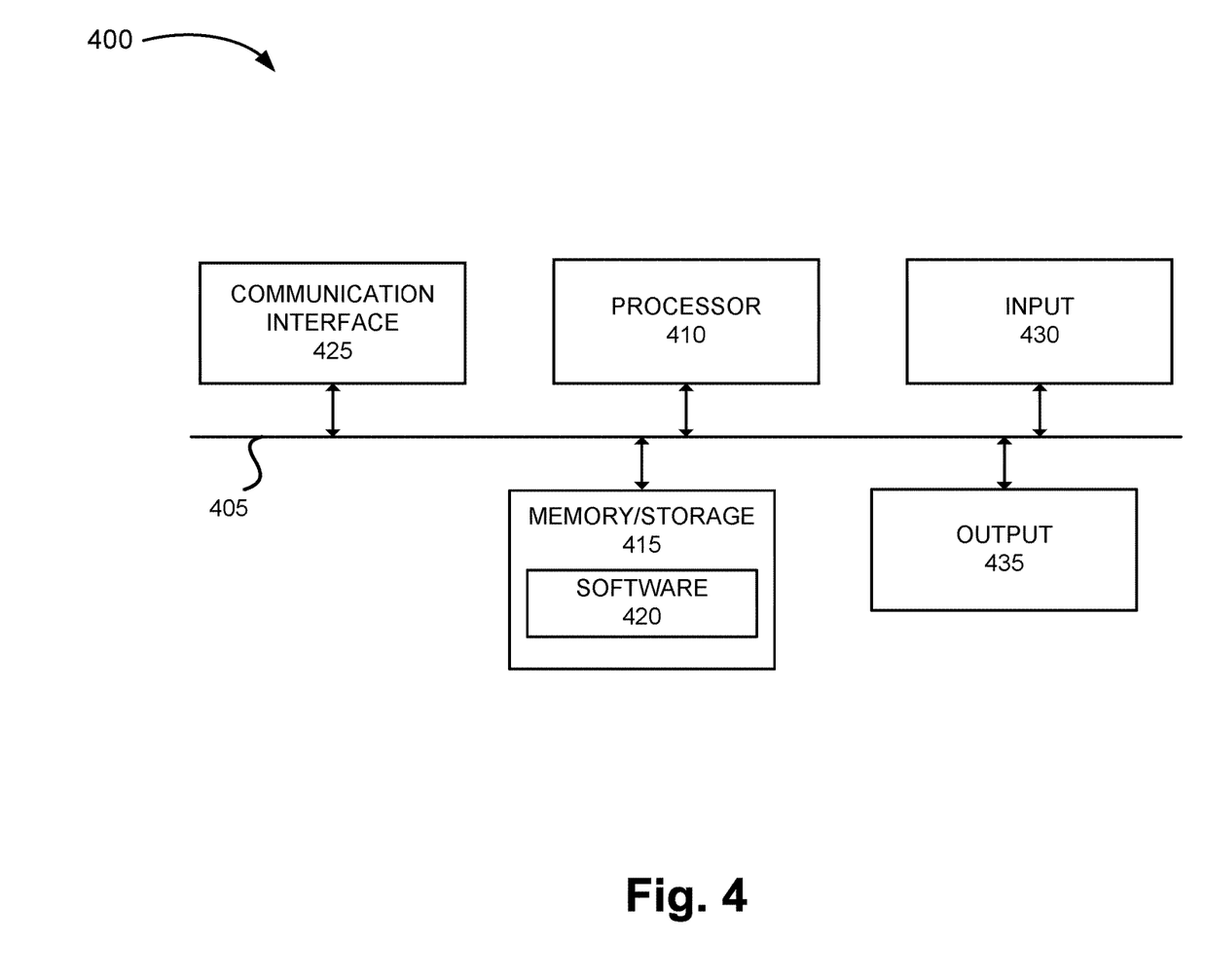
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to components included access devices 110, MEC devices 130, core devices 155, external devices 165, and end devices 180. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to MEC devices 130, software 420 may include an application that, when executed by processor 410, provides a function of the machine learning-based resource management service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or in some other operational state during its life-cycle (e.g., refreshed, paused, suspended, rebooted, or another type of state or status), using well-known virtualization technologies (e.g., hypervisor, container engine, virtual container, virtual machine, etc.) in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
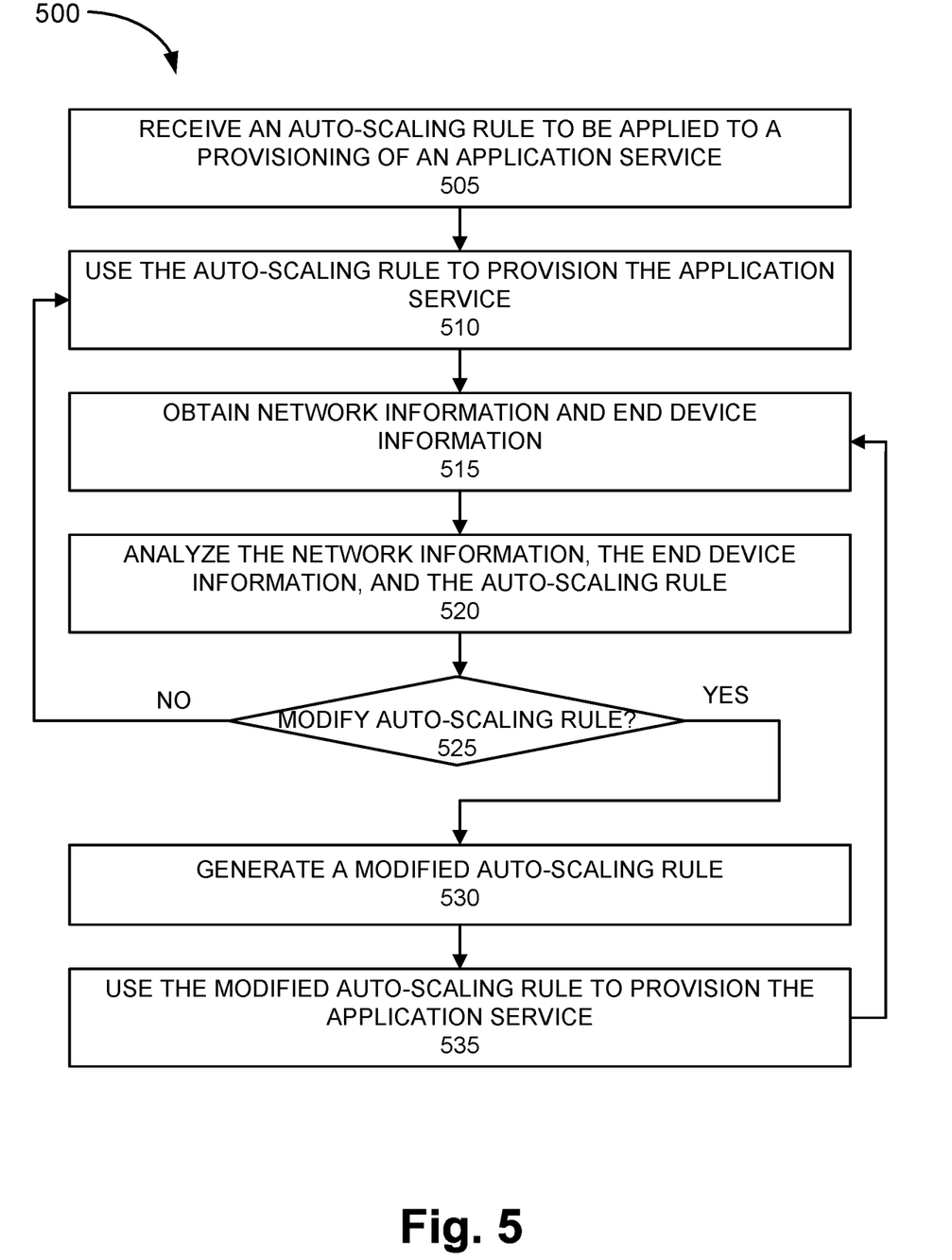
FIG. 5 is a flow diagram illustrating an exemplary process of an exemplary embodiment of the machine learning-based resource management service.

FIG. 5 is a flow diagram illustrating an exemplary process 500 of an exemplary embodiment of the machine learning-based resource management service. According to an exemplary embodiment, controller 220 may performs steps of process 500. For example, processor 410 executes software 420 to perform a step illustrated in FIG. 5, and described herein.

Referring to FIG. 5, in block 505, for example, controller 220 may receive an auto-scale rule to be applied to a provisioning of an application service. For example, RL agent 225 may receive a default auto-scaling rule from orchestrator 205.

In block 510, controller 220 may use the auto-scaling rule to provision the application service. For example, resource manager 230 may provision a host 250 with resources to provide the application service.

In block 515, controller 220 may obtain network information and end device information. For example, subsequent to the provisioning, controller 220 may obtain network information and end device information from a monitoring and tracking system. Controller 220 may obtain other types of collected information, as described herein.

In block 520, controller 220 may analyze the network information, the end device information, and the auto-scaling rule. For example, controller 220 may use the collected information, the auto-scaling rule, and a machine learning algorithm to identify optimal use of resources given the current state in the network, at end device 180, and the application service.

In block 525, controller 220 determines whether to modify the auto-scaling rule. For example, based on the result of the analysis and the auto-scaling rule, controller 220 determines whether to replace the auto-scaling rule.

When it is determined that the auto-scaling rule does not need to be modified (block 525-NO), process 500 may return to block 510. When it is determined that the auto-scaling rule needs to be modified (block 525—YES), controller 220 may generate a modified auto-scaling rule (block 530). For example, controller 220 may generate a modified auto-scaling rule that may change parameter values to values or range of values that were not included in the current auto-scaling rule. By way of further example, a minimum threshold value and/or a maximum threshold value may change, or a range of values may change. The new range of values may partially overlap a range of values in the current auto-scaling rule, or may be a range of values that lies entirely outside the range of values in the current auto-scaling rule. According to other examples, the modified auto-scaling rule may include other configuration changes relative to the current auto-scaling rule.

In block 535, controller 220 may use the modified auto-scaling rule so to provision the application service. For example, resource manager 230 may adjust the allocation of resources to host 250, such as vertical or horizontal auto-scaling, in accordance with the modified auto-scaling rule. Controller 220 may perform other types of re-provisioning.

FIG. 5 illustrates an exemplary process 500 of the machine learning-based resource management service, however, according to other embodiments, process 500 may include additional operations, fewer operations, and/or different operations than those illustrated in FIG. 5, and described herein. For example, controller 220 may select a machine learning algorithm to use among multiple machine learning algorithms based on the application service or the category of the application service. According to various exemplary embodiments, the machine learning algorithm may be a reinforcement learning algorithm, a supervised learning algorithm, and/or an unsupervised learning algorithm. Additionally, the machine learning-based resource management service may include pre-training of a machine learning system (e.g., supervised, unsupervised pre-training, etc.).

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    receiving, by a network device of an application service layer network, a request to provision a host device to provide an application service, wherein the request includes an auto-scaling rule for allocating network resources;
    provisioning, by the network device, the application service based on the auto-scaling rule;
    obtaining, by the network device subsequent to the provisioning, performance information pertaining to the host device;
    determining, by the network device, that a modified auto-scaling rule which replaces the auto-scaling rule is to be generated based on a machine learning algorithm and the performance information; and
    reprovisioning, by the network device, the application service based on the modified auto-scaling rule that includes at least one of a horizontal auto-scaling that adjusts a number of one or more instances of one or more of the network resources or a vertical auto-scaling that adjusts an amount of the network resources at a single instance.

2. The method of claim 1, wherein the application service layer network is a multi-access edge computing (MEC) network.

3. The method of claim 1, wherein the performance information pertaining to the host device includes resource utilization information and performance metric information.

4. The method of claim 1, wherein the modified auto-scaling rule includes at least one of a minimum threshold value or a maximum threshold value of a parameter that is different from a minimum threshold value or a maximum threshold value of the parameter included in the auto-scaling rule.

5. The method of claim 1, further comprising:
selecting, by the network device, the machine learning algorithm from among multiple machine learning algorithms based on a category associated with the application service.

6. The method of claim 1, wherein the network device is an edge manager.

7. The method of claim 1, further comprising:
obtaining, by the network device subsequent to the reprovisioning, other performance information pertaining to the host device; and
determining, by the network device, whether another modified auto-scaling rule that replaces the modified auto-scaling rule is to be generated based on the machine learning algorithm and the other performance information.

8. The method of claim 1, wherein the reprovisioning includes the vertical auto-scaling and the horizontal auto-scaling of the network resources allocated to support the application service.

9. A network device of an application service layer network comprising:
a processor configured to:
receive a request to provision a host device to provide an application service, wherein the request includes an auto-scaling rule for allocating network resources;
provision the application service based on the auto-scaling rule;
obtain, subsequent to the provision, performance information pertaining to the host device;
determine that a modified auto-scaling rule which replaces the auto-scaling rule is to be generated based on a machine learning algorithm and the performance information; and
reprovision the application service based on the modified auto-scaling rule that includes at least one of a horizontal auto-scaling to adjust a number of instances of one or more of the network resources or a vertical auto-scaling to adjust an amount of the network resources at a single instance.

10. The network device of claim 9, wherein the application service layer network is a multi-access edge computing (MEC) network.

11. The network device of claim 9, wherein the performance information pertaining to the host device includes resource utilization information and performance metric information.

12. The network device of claim 9, wherein the modified auto-scaling rule includes at least one of a minimum threshold value or a maximum threshold value of a parameter that is different from a minimum threshold value or a maximum threshold value of the parameter included in the auto-scaling rule.

13. The network device of claim 9, wherein the processor is further configured to:
select the machine learning algorithm from among multiple machine learning algorithms based on a category associated with the application service.

14. The network device of claim 9, wherein the network device is an edge manager.

15. The network device of claim 9, wherein the processor is further configured to:
obtain, subsequent to the reprovision, other performance information pertaining to the host device; and
determine whether another modified auto-scaling rule that replaces the modified auto-scaling rule is to be generated based on the machine learning algorithm and the other performance information.

16. The network device of claim 9, wherein the reprovision includes the vertical auto-scaling and the horizontal auto-scaling of the network resources allocated to support the application service.

17. A non-transitory computer-readable storage medium storing instructions executable by a processor of a network device of an application service layer network, which when executed cause the network device to:
receive a request to provision a host device to provide an application service, wherein the request includes an auto-scaling rule for allocating network resources;
provision the application service based on the auto-scaling rule;
obtain, subsequent to the provision, performance information pertaining to the host device;
determine that a modified auto-scaling rule which replaces the auto-scaling rule is to be generated based on a machine learning algorithm and the performance information; and
reprovision the application service based on the modified auto-scaling rule that includes at least one of a horizontal auto-scaling to adjust a number of instances of one or more of the network resources or a vertical auto-scaling to adjust an amount of the network resources at a single instance.

18. The non-transitory computer-readable storage medium of claim 17, wherein the instructions further comprise instructions, which when executed cause the network device to:
obtain, subsequent to the reprovision, other performance information pertaining to the host device; and
determine whether another modified auto-scaling rule that replaces the modified auto-scaling rule is to be generated based on the machine learning algorithm and the other performance information.

19. The non-transitory computer-readable storage medium of claim 17, wherein the network device is an edge manager, and wherein the application service layer network is a multi-access edge computing (MEC) network.

20. The non-transitory computer-readable storage medium of claim 17, wherein the modified auto-scaling rule includes at least one of a minimum threshold value or a maximum threshold value of a parameter that is different from a minimum threshold value or a maximum threshold value of the parameter included in the auto-scaling rule.

* * * * *